United States Patent
Striem Amit (10) Patent No.: US 9,635,040 B2
(45) Date of Patent: Apr. 25, 2017

(54) METHOD AND APPARATUS FOR COLLECTING INFORMATION FOR IDENTIFYING COMPUTER ATTACK

(71) Applicant: Cybereason Inc, Wilmington, DE (US)

(72) Inventor: Yonatan Striem Amit, Gedera (IL)

(73) Assignee: Cybereason Inc., Boston, MA (US)

( * ) Notice: Subject to any disclaimer, the term of this patent is extended or adjusted under 35 U.S.C. 154(b) by 97 days.

(21) Appl. No.: 13/827,412

(22) Filed: Mar. 14, 2013

(65) Prior Publication Data
US 2014/0283050 A1    Sep. 18, 2014

(51) Int. Cl.
H04L 29/06    (2006.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
USPC ....................................... 726/22–25
See application file for complete search history.

(56) References Cited

U.S. PATENT DOCUMENTS

| | | | | |
|---|---|---|---|---|
| 6,338,085 B1 * | 1/2002 | Ramaswamy | ...... | G06F 17/3087 707/E17.11 |
| 7,841,011 B2 * | 11/2010 | Manson et al. | ................. | 726/28 |
| 8,065,206 B2 * | 11/2011 | Thomas | ........................... | 705/34 |
| 8,453,234 B2 * | 5/2013 | Dawson et al. | ................. | 726/22 |
| 8,713,641 B1 * | 4/2014 | Pagan et al. | ....................... | 726/4 |
| 8,776,241 B2 * | 7/2014 | Zaitsev | ........................... | 726/25 |
| 8,839,419 B2 * | 9/2014 | Hudis et al. | ..................... | 726/22 |
| 2005/0198366 A1 * | 9/2005 | Kreiner | ................... | H04L 45/42 709/238 |
| 2006/0161816 A1 * | 7/2006 | Gula et al. | ....................... | 714/39 |
| 2010/0023201 A1 * | 1/2010 | Kinney | ................. | G07C 5/008 701/31.4 |
| 2011/0047597 A1 * | 2/2011 | Mahaffey | .............. | G06F 21/564 726/3 |
| 2012/0110174 A1 * | 5/2012 | Wootton | ............... | G06F 21/564 709/224 |
| 2015/0358406 A1 * | 12/2015 | Scheer | ................ | H04L 67/1095 709/248 |

* cited by examiner

*Primary Examiner* — John B King
(74) *Attorney, Agent, or Firm* — Flachsbart & Greenspoon, LLC (57) ABSTRACT

A computer-implemented method and apparatus for identifying attacks, comprising: receiving information related to a computerized network, the information comprising description of the network and events occurring within the network; processing the events, comprising determining whether additional data is required; responsive to determining that additional information is required, collecting the additional information and processing the additional information; and providing attack information based on the information and on the additional information, wherein the additional information is more resource consuming to obtain or process than the information.

17 Claims, 2 Drawing Sheets

METHOD AND APPARATUS FOR COLLECTING INFORMATION FOR IDENTIFYING COMPUTER ATTACK

TECHNICAL FIELD

The present disclosure relates to computer security in general, and to collecting information for identifying attacks or attack attempts to a computer network, in particular.

BACKGROUND

Modern computerized systems all over the world are often threatened by intrusive attacks. Some attacks are targeted at a specific computer or network for a specific purpose, such as causing targeted damage or collecting specific information. Other attacks, however, are more general and are targeted at a wide range of computers, networks and users.

Intrusion detection systems are constantly attempting to detect intrusive attacks and generate alerts whenever an intrusive attack is identified.

Typical intrusion detection systems are signature-based and/or protocol-analysis based. Such systems typically include a subset of: port assignment, port following, protocol tunneling detection, protocol analysis, Transmission Control Protocol (TCP) reassembly, flow assembly, statistical threshold analysis, pattern matching and the like.

One typical problem associated with attack detection relates to the tradeoff between the effort required for collecting and analyzing a lot of information, which may also generate many false positive alerts, and collecting a smaller amount of information which may miss attacks and be subject to false negative indications.

False negative situations may therefore occur if the intrusion detection is too tolerant, and may thus miss malicious attacks and prove ineffective. Too strict detection, on the other hand, may identify legitimate activities as suspicious, activate prevention measures and disturb the normal work flow of a system, a user, or an organization. Too strict detection and prevention may also require more resources, such as computing time, computing power, storage, and others, required for collecting the information and processing it.

BRIEF SUMMARY

One exemplary embodiment of the disclosed subject matter is a computer-implemented method performed by a computerized device, comprising: receiving information related to a computerized network, the information comprising description of the network and events occurring within the network; processing the events, comprising determining whether additional data is required; responsive to determining that additional information is required, collecting the additional information and processing the additional information; and providing attack information based on the information and on the additional information, wherein the additional information is more resource consuming to obtain or process than the information. The method may further comprise repeating said determining, said collecting, and said processing for the additional information. Within the method, said processing the events optionally comprises: identifying markers within the events to obtain indications to attacks or attack attempts at the network; and analyzing events associated with attacks or attack attempts. Within the method identifying the markers may comprise: a language application step for identifying suspicious events by behavior of entities which is different from behavior of comparable entities or from expected behavior; and a heuristic application step for marking event combinations known to be suspicious. Within the method analyzing the events may comprise: identifying event combinations; and clustering the events. Within the method receiving the information may comprise: receiving network description; and receiving raw information related to the events. Within the method receiving the information may further comprise a step selected from the group consisting of: receiving external information; receiving information from a collection system; and receiving information from a log file. Within the method, receiving the additional information may be received from a same source as the information, but is sampled at higher density.

Another exemplary embodiment of the disclosed subject matter is a computer-implemented method performed by a computerized device, comprising: receiving information related to a computerized network, the information comprising description of the network and events occurring within the network; identifying markers within the events to obtain indications to attacks or attack attempts at the network; analyzing events associated with attacks or attack attempts; and providing attack information. Within the method, identifying the markers may comprise: a language application step for identifying suspicious events by behavior of entities which is different from behavior of comparable entities or from expected behavior; and a heuristic application step for marking event combinations known to be suspicious. Within the method, analyzing the events may comprise: identifying event combinations; and clustering the events. Within the method, analyzing the events may further comprise determining whether additional data is required, and responsive to determining that additional information is required, collecting the additional information and processing the additional information, wherein the additional information is more resource consuming to obtain or process than the information. Within the method, the additional information is optionally received from a same source as the information, but is sampled at higher density. Within the method, markers are optionally identified by similar events affecting two or more computers substantially simultaneously.

Yet another exemplary embodiment of the disclosed subject matter is an apparatus having a processing unit and a storage device, the apparatus comprising: an information receiving component for receiving information related to a computerized network, the information comprising description of the network and events occurring within the network; a marker identification component for identifying markers within the events to obtain indications to attacks or attack attempts at the network; and an event analysis component for analyzing events associated with attacks or attack attempts. Within the apparatus, the marker identification component may comprise: a language application component for identifying suspicious events by behavior of entities which is different from behavior of comparable entities or from expected behavior; and a heuristic application component for marking event combinations known to be suspicious. Within the apparatus, the event reconstruction component comprises: an event combination identification component for identifying event combinations; an event clustering component for clustering the events; and a further required information identification component for identifying additional information required, wherein the additional information is more resource consuming to obtain or process than the information.

Yet another exemplary embodiment of the disclosed subject matter is a computer program product comprising: a non-transitory computer readable medium; a first program instruction for receiving information related to a computerized network, the information comprising description of the network and events occurring within the network; a second program instruction for processing the events, comprising determining whether additional data is required; a third program instruction for responsive to determining that additional information is required, collecting the additional information and processing the additional information; and a fourth program instruction for providing attack information based on the information and on the additional information, wherein the additional information is more resource consuming to obtain or process than the information, and wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block or blocks of block diagrams.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to detect malicious activity in a computer system.

Malicious activity, such as any other activity in a computer network involves entities in the environment, and events performed on or involving these entities.

Exemplary entities may include computers, servers, processes, modules, threads, applications, web sites, databases or any other entity used by an administrator, an IT professional, a user of a computer, a program or a process, or the like. In some embodiments users may also be considered entities.

Events may relate to actions associated with one or more entities. For example, a user may change the privileges of a computer, a process may be executed by a computer, a web site may be accessed by a module, a user may use a computer, or the like.

Events relating to malicious activities are therefore not different in their nature from legitimate events performed by legitimate users. Even when relating to rare or suspicious events, such events may also be performed legitimately under certain circumstances.

When attempting to detect suspicious events, it is required to collect and analyze data related to the network activity. The corpus of detected events may amount to significant quantities which may require a lot of resources for analysis and detection of malicious activity.

Another technical problem relates to the tradeoff that exists between the amount of collected data and the effectiveness of the attack detection and prevention.

If strict detection is employed, a lot of effort and resources may be required for collecting and analyzing the data. In addition, strict detection may cause blocking or other disturbances to the normal work flow, due to false alerts. On the other hand, if tolerant detection is employed, some attack or attack attempts may be missed, which may cause invaluable damage to the organization.

One technical solution comprises the efficient collection, from all available sources, of events and data that may be suspicious as being associated with malicious attacks or attack attempts, and analyzing them in an efficient manner.

On a first stage, events within the network are collected, using multiple sources, such as network events, end point events, information from other systems such as collection systems, information from logging systems, or the like. Further information may be received from external sources, such as suspicious or clear IP addresses, file names, or the like.

On a second stage, the collected data may be analyzed for detecting markers, i.e., indications for possible malicious activity associated with any of the collected events. The analysis may comprise applying computations for detecting suspicious events, or applying heuristics, such as rules related to specific events or combinations, or applying any other analysis tools or methods. Additionally, markers may indicate anything that may be considered "noteworthy". For example, a marker may also indicate that a specific program is a browser, or a specific program is rarely used in the organization. Similarly, a marker may indicate that a specific action on behalf of some user may occur outside her normal working hours.

On a third stage, the collected events, optionally with the markers, or after eliminating part of the events, are analyzed, i.e., analyzed for obtaining more consolidated meaning and eliminating "noise", e.g. discarding of events which are less likely to be associated with malicious activity. Reconstruction may include aggregating markers based on predetermined criteria, such as event A and event B within a time frame of one week, event C and event D on the same computer, or the like. Aggregation may also be performed using any other markers, such as effects, sources of events, similarity between events, or the like. Analysis may also include clustering the events into groups and assigning a rank to each such group, wherein the rank may indicate a suspicion level that the group is associated with malicious activity.

Based on output provided by the analysis stage, additional information may be identified and collected on a fourth stage, wherein the information may be useful in further analysis. The requested information may be such information that is not normally collected at a previous stage, due to its high price, for example in terms of network communication volume, storage, processing requirements, disturbance to ongoing activity, or the like.

The newly collected information, optionally together with previously collected information may then be analyzed in accordance with the second and third stages as described above.

It will be appreciated that the process can be iterative, and in accordance with output from the third stage as applied to the newly collected information, further data which may be more expensive to obtain may be collected and analyzed. It will also be appreciated that the stage order may be different. Thus, the event analysis may be performed before marker identification, or the order of operations within each stage may change, In some embodiments, a possible attack may be allowed to spread within the organization, in order to reduce false negatives, i.e., avoid cases in which a real attack is not recognized.

A lot of resources are invested in detecting and stopping intrusions and unauthorized modifications of computer systems. Such resources may include firewalls, malware detectors, antivirus programs, or the like.

Current methods rely on detecting attacks at the point of entry into a system or a network. For example, an antivirus program may attempt to detect when a virus is downloaded or executed, a malware detector will search for malware on a computer, or the like.

However, if a user such as a network administrator is willing to forgo preventing an attack on some computers, the infection of multiple other computers may be prevented. Generally, an adversary would like to infect or harm a multiplicity of computers rather than a single computer in order to create more damage. In other cases, the data an adversary seeks may be located on a different computer than the computer the adversary first accessed. There may also be other cases in which an adversary will attempt to damage multiple machines.

Generally, there is a tradeoff between false alerts and the ability to detect malicious events. Using current technology, if the goal is to stop an intrusion, the network is likely to encounter problems associated with false positives. If the sensitivity parameter is set too high, events will be triggered which should not be triggered.

Such tradeoff may be solved by aggregating alerts among machines. For example, suppose there is a suspicion that machine A is harmed, and machine A communicates with machine B. If machine B then raises a suspicion that machine B is compromised, then the suspicions may be strengthened. Since an apparent contagion is observed, there is increased suspicion that both machines are harmed. For example, if at some initial time $T_0$ no suspicion is detected, and after some time there is a significant number of suspicions, the suspicions may strengthen each other, such that each one is more likely to be true. Thus, markers or other indications may be provided where events are found which affect two or more computers substantially simultaneously.

This approach may not be useful when the network contains a single or a very small number of computers. The risk of letting an attacker infecting a small number of computers before an action is taken is not an option, and no tradeoff may be enabled.

However, in other cases such approach may be useful. For example, in an enterprise system containing many computers, allowing an adversary to infect a small number of computers (e.g., five or less) before detecting an intrusion can greatly decrease the false positive rate while leaving the false negative rate, which may be raised only of more than five computers are infected, may remain unchanged.

Thus, a tradeoff is suggested between the false positive rate, the false negative rate and the number of computers affected. By searching for patterns of suspected attacks across enterprise systems rather than for separate attacks, the ability to detect an attack may increase significantly. Better detection may be achieved with fewer false positives than is currently possible.

One technical effect of the disclosure relates to providing a comprehensive solution for collecting and analyzing data for identifying attacks or attack attempts targeted towards a computer network or units within the network.

Another technical effect of the disclosure relates to progressive data collection. Data that is inexpensive or simple to obtain is collected at an initial stage, and more expensive or complex data may be gradually gathered according to the needs and the expected contribution of the data to detecting attacks or attack attempts.

Yet another technical effect of the disclosure relates to progressive processing, wherein large quantities of data undergo initial processing to obtain markers. Then more resource consuming analysis may be performed over smaller amounts of data, as determined from the markers.

Figure 1:
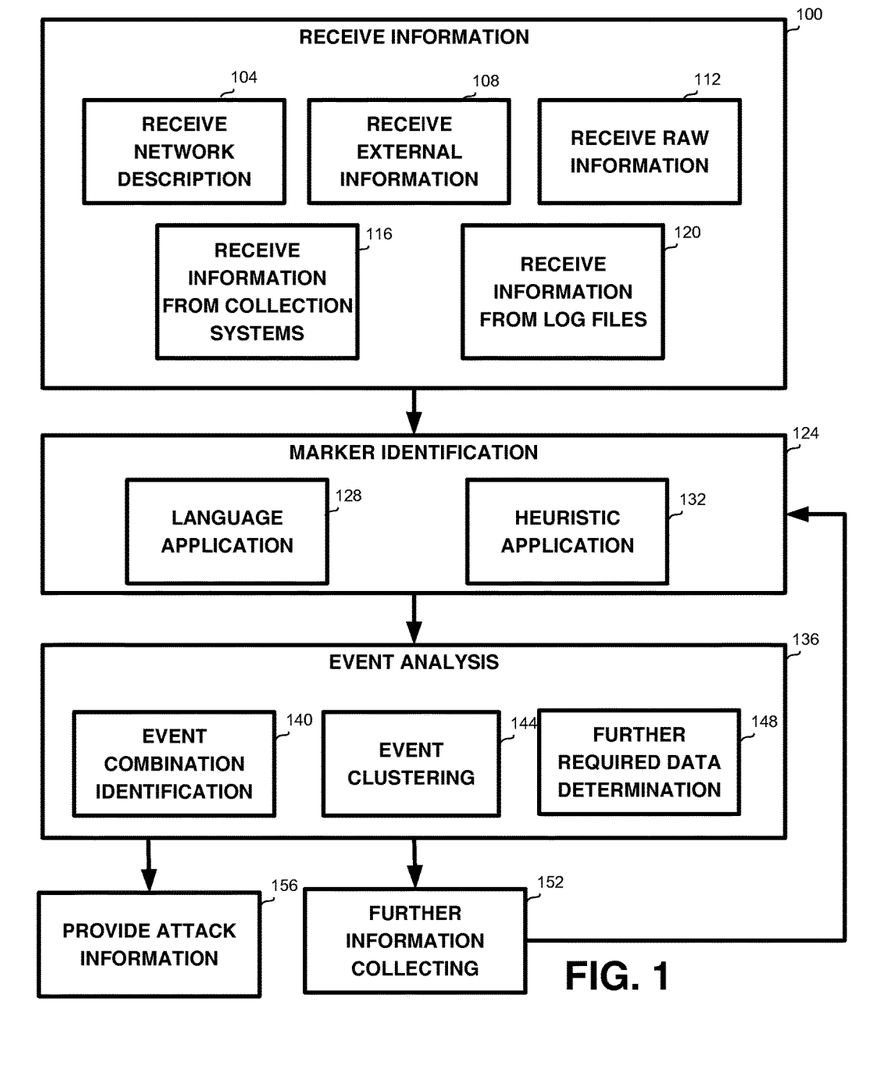
FIG. 1 is a flowchart of steps in a method for collecting and analyzing events in a computer network, in accordance with some exemplary embodiments of the disclosed subject matter.

Referring now to FIG. 1, showing a flowchart of steps in a method for collecting and analyzing events in a computer network.

On information receiving step 100, information may be collected or received for processing. The information may be received in a number of steps, which may be performed in any required order, such as sequentially, simultaneously, interleaved, or the like.

On step 104, description of the network may be received, including for example the stations, servers, clients of the network, programs expected to be executed by computers, services to be consumed, privileges, or any other entities.

On step 108, external information related to the entities may be received, such as but not limited to suspicious IP addresses, names or signatures of files known to be safe or problematic, or other information which is generally easy to apply and does not require intensive computations.

It will be appreciated that steps 104 and 108 can be performed once or periodically, and the information may be used for longer periods of time, and updated as required.

On step 112, raw information may be received which relates to events occurring in the network, for example a user logging in to a computer, IP address accessed by a computer, service consumed, files accessed or modified, privileges modified, or any other data or meta data related to the network and its operation. The raw data may be collected from the end units such as client computers, from servers, from network devices, or the like. The data may be collected by monitoring the computers or network, or from dedicated programs installed on the computing devices.

On step 116, network activity information may be received from other collection systems which may be collecting network information, for example network sniffing tools, or the like.

On step 120, information may be received from log files created by tools such as a firewall, a file access control program, an anti-virus program, or the like.

Once the information is collected, the information or parts thereof may be passed to marker identification step 124, which provides for initial processing of the data and identifying markers which may be indicative of attacks or computer attacks. The markers may be searched for in a large amount of data, therefor processing may be performed by a multiplicity of computing devices which may be collocated at the organization, remote, use cloud computing services, or the like.

Marker identification step 124 may comprise language application step 128 in which suspicious events are identified by the behavior of entities associated with the events, which is different from the behavior of comparable entities or from their expected behavior. For example, a Disjunctive Normal Form (DNF) may be used in which the suspicion value depends on the value of a given formula. The atoms can be observations, and clauses may correspond to combinations of observations which are suspicious. Thus evaluating the value of a clause may provide with a suspicion level for an activity. It will be appreciated that a subset of DNF or any other language may be used. It will be appreciated that marker identification may involve identifying a static property such as a process performing some heuristically evil indication, a marker may be of statistical nature, such as a computer executing a program in an abnormal hour, or a process communicating with a site with which processes having similar name hardly ever communicate, or a combination thereof, such as processes executing with administrator privileges from a folder which is rarely accessed.

Marker identification step 124 may also comprise heuristic application step 132 in which combinations known to be suspected are marked, such as a combination of one or more events with or without the absence of one or more other others. For example, a user logging into a computer and accessing a site without accessing another file known to be required. In another example, when attempting to log into a computer from a suspected IP, while the IP might be suspected, if an initial login attempt fails, then the level of suspicion may be increased. IN yet another example, combining multiple signatures known to be associated with malware may be suspicious. By aggregating more than one signature, the level of certainty may increase, thus reducing the number of false positives.

The markers collected on marker identification step 124 may be relatively easy to obtain, i.e., do not require intensive processing. However, the markers are of relatively low certainty, thus providing only initial suspicion indication, and might include some false positives.

The markers and optionally also the information collected on step 100 may then be passed to event analysis step 136.

Event analysis step 136 may comprise more complex and therefore more expensive processing, but may provide more significant indications for attacks or attack attempts, or requirements for more information. Analysis step 136 may be operated on events collected from multiple locations, such as different devices or organizational units, servers, network devices, or the like. However, event analysis step 136 is optional.

Event analysis step 136 may comprise event combination identification step 140, in which advanced combinations of events may be identified. For example, such combination may refer to events A and B occurring within a one day time window, and events C and D occurring within a one week time window.

Event analysis step 136 may further comprise event clustering step 144, in which collected events or a subset thereof after some events were filtered out, are weighed and clustered to identify clusters of significant events which may be associated with attacks or attack attempts. An exemplary embodiment of event clustering is described in US patent application titled "Method and Apparatus for Classifying and Combining Computer Attack Information" by the same inventor as the current application, and filed concurrently with the current application, hereby incorporated by reference in its entirety and for all purposes.

Once suspicious events or event combinations are identified by event combination identification step 140 or event clustering step 144 as suspicious, further required information may be determined on step 148, in order to further assess the possible attacks. The further required information may be more expensive or resource consuming to obtain or process than the information obtained on information receiving step 100, or determined on previous activations of further required data determination step 148. For example, the required information may include more detailed logs of a particular device, full logging of information sent by or received by a computing device, patterns of keyboard activity, patterns of mouse movements, communications between devices, data available or used on a particular device, contents of a transfer, or the like.

The determined information may then be collected on further information collecting step 152. The newly collected information may then be transferred again to marker identification step 124 and event analysis step 136. During event analysis step 136 further required information may be determined and collected.

Whether or not more data is required, information about a possible identified attack may be provided to a user, to another system or the like, using any channel, such as raising an audio alert, sending a message via any communication channel, or the like.

It will be appreciated that the price, e.g., the time or resources required for collecting or processing the further information may increase with each such iteration, depending on the suspicion level, the necessity, the information amount, the processing required for assessing the suspicions, or the like. Thus, more expensive information is collected and processed only when suspected to be necessary and after less expensive information is collected and used.

Figure 2:
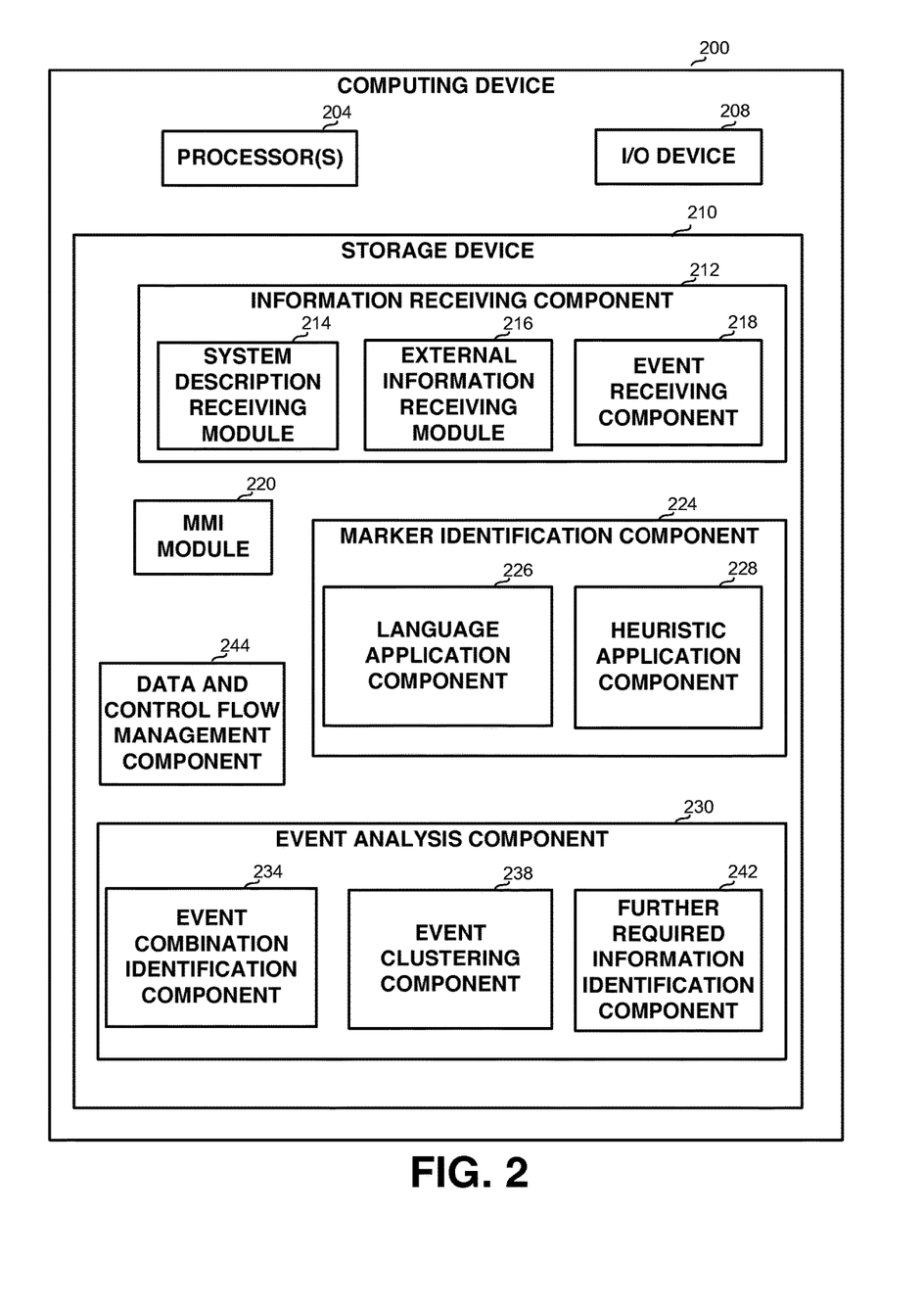
FIG. 2 is a block diagram of components in a system for collecting and analyzing events in a computer network, in accordance with some exemplary embodiments of the disclosed subject matter.

Referring now to FIG. 2 showing a block diagram of components in a system for collecting and analyzing events in a computer network.

The system may be implemented as one or more computing devices such as computing device 200, which may comprise one or more processors 204. Any of processors 204 may be a Central Processing Unit (CPU), a microprocessor, an electronic circuit, an Integrated Circuit (IC) or the like. Alternatively, computing device 200 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 204 may be utilized to perform computations required by comptuing device 200 or any of its subcomponents.

In some embodiments, computing device 200 may comprise or be in communciation with one or more input-output (I/O) devices 208 such as a terminal, a display for displaying an image, speakers, a microphone or another audio I/O devices or the like, a keyboard, a touch screen, an I/O device used for recognizing a person or interacting with the system, or the like.

Computing device 200 may comprise one or more storage devices 210 for storing executable components. Storage device 210 may also contain data during execution of one or more components. Storage device 210 may be persistent or volatile. For example, storage device 210 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 210 may retain program code operative to cause any of processors 204 to perform acts associated with any of the steps shown in FIG. 1 above, for example receiving a system description, receiving events, identifying markers, analyzing events and determining further information TO BE collected.

The components detailed below may be implemented as one or more sets of interrelated computer instructions, executed for example by any of processors 204 or by another processor. The components may be arranged as one or more executable files, dynamic libraries, static libraries, methods, functions, services, or the like, programmed in any programming language and under any computing environment. Storage device 210 may comprise or be loaded with one or more of the components, which can be executed on computing platform 200 by any one or more of processors 204. Alternatively, any of the executable components may be executed on any other computing device which may be in direct or indirect communication with computing device 200.

Storage device 210 may comprise information receiving component 212 for receiving relevant information. For example, information receiving component 212 may comprise system description receiving module 214 for receiving information related to the system structure, entities, events types or the like.

Information receiving component 212 may further comprise external information receiving module 216 for receiving external information such as but not limited to suspicious IP addresses, names or signatures of files known to be clear or problematic, or the like.

Information receiving component 212 may also comprise event receiving component 218. Event receiving component 218 may receive events from multiple sources, such as but not limited to raw information related to the events occurring in the network, information from collecting systems such as sniffing tools, information from log files of other systems, or the like.

Storage device 210 may comprise man machine interface (MMI) module 220 for enabling a user to enter description of the system, set parameters, receive results, or the like. MMI module 220 may receive or display data using any of I/O devices 208, or on an I/O device associated with a different computing platform. MMI module 220 may also be provided as a web service executed by one computing platform and providing client functionality on another.

Storage device 210 may also comprise marker identification components 224 for identifying basic markers in the information collected by Information receiving component 212.

Marker identification components 224 may comprise language application component 226 for applying rules provided by the user, for example for identifying suspicious events by the behavior of associated entities, which is different from comparable entities or from their expected behavior Marker identification may comprise heuristic application component 228 for identifying event combinations which are known to be suspicious.

Storage device 210 may comprise event analysis component 230 for further analysis of the events.

Event analysis component 230 may comprise event combination identification component 234 for identifying suspicious event combinations by applying more complex rules than the rules applied by marker identification component 224.

Event analysis component 230 may further comprise event clustering component 238 for clustering the events for identifying groups of suspicious events which may be associated with attacks or attack attempts.

Event analysis component 230 further comprises further required information identification component 242 for identifying more information that may be harder or more expensive to obtain or process, but which may provide more specific information which may be helpful in verifying an attack or identifying the attacker, attacked computers, or other valuable information. It will be appreciated that further activations of further required information identification component 242 may obtain more expensive or harder to obtain or process information, as the easy to obtain and process information has been exploited and more specific information is required.

Storage device 210 may further comprise a data and control flow management component 242 for managing the flow of the processes and data, activating other components and providing the required data, or the like.

The disclosed system and method provide for collecting and analyzing data and events for detecting attacks or attack attempts to a computer network. The analysis is incremental so that the less intensive and more straight-forward analysis is performed over the initial data which might be of larger quantities and easier to obtain, while the more resource consuming analysis is performed over filtered or aggregated data. The disclosed system and method are also incremental in that data that is easy to obtain or process is obtained first. Then based upon the processing results, it is determined what additional data is required, wherein the additional data may be harder to obtain. The additional data may then be obtained and processed. The process of determining further required data, followed by obtaining and processing may be repeated as required. In some instances, the initial data and the data collected at a later time may be collected or received by sampling the same source or sources, wherein such sampling may include random sampling, Gibbs sampling or any other type of sampling. The initial data may be sampled at a lower density and the later sampled data may be sampled at higher density if required.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    monitoring by a computer a set of events in a computer network;
    receiving simple information, the simple information requiring less than a threshold number of steps to process, related to the computer network, the simple information comprising a description of the network and the events occurring within the network;
    processing the events, comprising determining whether additional complex information about the events occurring within the network is required, the complex information requiring more than the threshold number of steps to process than any of the simple information;
    while it is determined that additional complex information about the events occurring within the network is required, iteratively performing the following steps:
        collecting the additional complex information; and processing the additional complex information, comprising
    determining whether further additional complex information is required; and
    providing attack information based on the simple information and on the additional complex information collected while iterating, the time or resources required for collecting or processing the further additional complex information increases with each iteration;
outputting by the computer the attack information;
wherein each additional complex information is more resource consuming to obtain or process than the simple information previously received;
wherein the additional complex information is more expensive than the simple information previously received; and
wherein the additional complex information is selected from the group consisting of 1) full logging of information sent by or received by a computing device; and 2) pattern of keyboard activity, patterns of mouse movements, communications between devices, data available or used on a particular device, or contents of a transfer.

2. The computer-implemented method of claim 1, wherein said processing the events comprises:
    identifying markers within the events to obtain indications to attacks or attack attempts at the network; and
    analyzing the events associated with the attacks or the attack attempts.

3. The computer-implemented method of claim 2, wherein identifying the markers comprises:
    a language application step for identifying suspicious events by behavior of entities which is different from behavior of comparable entities or from expected behavior; and
    a heuristic application step for marking event combinations known to be suspicious.

4. The computer-implemented method of claim 2, wherein analyzing the events comprises:
    identifying event combinations; and
    clustering the events.

5. The computer-implemented method of claim 1, wherein receiving the simple information comprises:
    receiving network description; and
    receiving raw information related to the events.

6. The computer-implemented method of claim 5, wherein receiving the simple information further comprises a step selected from the group consisting of:
    receiving external information;
    receiving information from a collection system; and
    receiving information from a log file.

7. The computer-implemented method of claim 1, wherein the additional complex information is received from a same source as the simple information, but is sampled at higher density.

8. The computer-implemented method of claim 1, further comprising identifying markers within the events to obtain indications to attacks or attack attempts at the network.

9. The computer-implemented method of claim 8, wherein identifying the markers comprises:
    a language application step for identifying suspicious events by behavior of entities which is different from behavior of comparable entities or from expected behavior; and
    a heuristic application step for marking event combinations known to be suspicious.

10. The computer-implemented method of claim 8, wherein analyzing the events comprises:
    identifying event combinations; and
    clustering the events.

11. The computer-implemented method of claim 10, wherein analyzing the events further comprises determining whether additional complex information is required, and
    responsive to determining that additional complex information is required, collecting the additional complex information and processing the additional complex information,
    wherein the additional complex information is more resource consuming to obtain or process than the simple information.

12. The computer-implemented method of claim 11, wherein the additional complex information is received from a same source as the simple information, but is sampled at higher density.

13. The computer-implemented method of claim 8, wherein the markers are identified by similar events affecting two or more computers substantially simultaneously.

14. An apparatus having a processing unit and a storage device, the apparatus comprising:
    a monitoring component for monitoring by a computer a set of events in a computer network;
    an information receiving component for receiving simple information related to the computer network, the simple information comprising a description of the network and the events occurring within the network, the simple information requiring less than a threshold number of steps to process;
    a marker identification component for identifying markers within the events to obtain indications to attacks or attack attempts at the network;
    a further required information identification component for iteratively determining whether additional complex information about events occurring within the network is required, the additional complex information requiring more than the threshold number of steps to process than any of the simple information, and the time or resources required for collecting or processing the further additional complex information increases with each iteration; and
    an event analysis component for iteratively analyzing events associated with the attacks or the attack attempts based on the simple information,
    wherein the additional complex information is more expensive than the simple information;
    wherein the additional complex information is selected from the group consisting of 1) full logging of information sent by or received by a computing device; and 2) pattern of keyboard activity, patterns of mouse movements, communications between devices, data available or used on a particular device, or contents of a transfer;
    an outputting component for outputting by the computer the indications to the attacks or the attack attempts.

15. The apparatus of claim 14, wherein the marker identification component comprises:
    a language application component for identifying suspicious events by behavior of entities which is different from behavior of comparable entities or from expected behavior; and
    a heuristic application component for marking event combinations known to be suspicious.

16. The apparatus of claim 14, wherein the event reconstruction component comprises:

an event combination identification component for identifying event combinations;
an event clustering component for clustering the events; and
a further required information identification component for identifying complex additional information required.

17. A computer program product comprising: a non-transitory computer readable medium:
a first program instruction for monitoring by a computer a set of events in a computer network;
the first program instruction also for receiving simple information related to the computer network, the simple information comprising a description of the network and the events occurring within the network, the simple information requiring less than a threshold number of steps to process;
a second program instruction for processing the events, comprising determining whether additional complex information about the events occurring within the network is required, the additional complex information requiring more than the threshold number of steps to process than any of the simple information;
a third program instruction for iteratively performing the following steps while it is determined that additional complex information is required, the time or resources required for collecting and processing the further additional complex information increases with each iteration:
collecting the additional complex information; and
and processing the additional complex information, comprising determining whether further additional complex information is required; and
a fourth program instruction for providing attack information based on the simple information and on the additional complex information collected while iterating,
the fourth program instruction also for outputting by the computer the attack information,
wherein the additional complex information is more expensive than the simple information, and;
wherein the additional complex information is selected from the group consisting of 1) full logging of information sent by or received by a computing device; and 2) pattern of keyboard activity, patterns of mouse movements, communications between devices, data available or used on a particular device, or contents of a transfer; and
wherein said first, second, third and fourth program instructions are stored on said non-transitory computer readable medium.

* * * * *